United States Patent
van der Lely et al.

[11] 4,323,136
[45] Apr. 6, 1982

[54] MOVEMENT STOPPING SAFETY DEVICE FOR AGRICULTURAL MACHINE

[75] Inventors: Cornelis van der Lely, Zug, Switzerland; Ary van der Lely, Maasland, Netherlands

[73] Assignee: C. van der Lely N.V., Maasland, Netherlands

[21] Appl. No.: 100,269

[22] Filed: Dec. 4, 1979

[30] Foreign Application Priority Data

Dec. 8, 1978 [NL] Netherlands ............. 7811965

[51] Int. Cl.³ ............................................. B60R 21/00
[52] U.S. Cl. .................... 180/271; 56/10.3; 56/DIG. 15; 172/59; 172/68; 172/112; 172/529; 188/29; 188/31
[58] Field of Search ........... 180/271, 274, 14.5; 172/6, 5, 4, 3, 68, 69, 59, 112, 528, 529, 530, 233, 234, 235; 56/10.2, 10.3, 10.4, DIG. 15, DIG. 22; 188/29, 31

[56] References Cited

U.S. PATENT DOCUMENTS

| | | | |
|---|---|---|---|
| 2,489,633 | 11/1949 | Fulgham | 172/5 |
| 2,729,299 | 1/1956 | Rink | 180/274 |
| 2,973,613 | 3/1961 | Hagendorn | 56/10.5 |
| 2,993,329 | 7/1961 | Schmidt | 56/10.3 |
| 3,111,800 | 11/1963 | Quianthy | 56/10.2 |
| 3,965,657 | 6/1976 | Jespersen | 180/274 X |

Primary Examiner—Joseph F. Peters, Jr.
Assistant Examiner—Milton L. Smith

[57] ABSTRACT

An agricultural machine has at least one movable tool, such as a cultivating rotor, mower or raking member, spreader disc, or other driven member such as a tractor wheel or freely rotatable roller, which parts are interrupted in movement by a protective mechanism. The mechanism can be a pawl device associated with an overload coupling in the drive train that is actuated by a mechanical or electrical monitor to overload the device. The monitor can be a pivoted cover that partly overlies a rear roller or space adjacent same with projections that intercept the roller or a trip bar with contacts that opens or closes a circuit in a system that interrupts the drive to the moving parts responsive to contact with an external object. In another variation, the circuit can have sensors such as infrared or photoelectric cells to detect the presence or lack of presence of a human operator and these sensors can be placed in a tractor cab. Alternatively, the driver seat can be in the circuit to activate the circuit when the seat is vacated.

9 Claims, 11 Drawing Figures

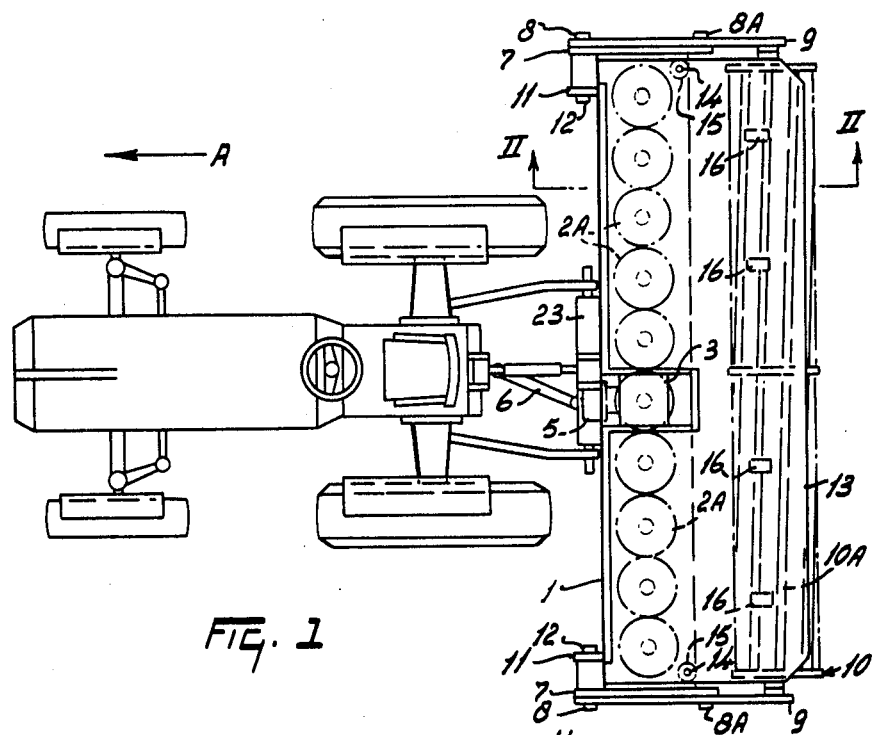
FIG. 1
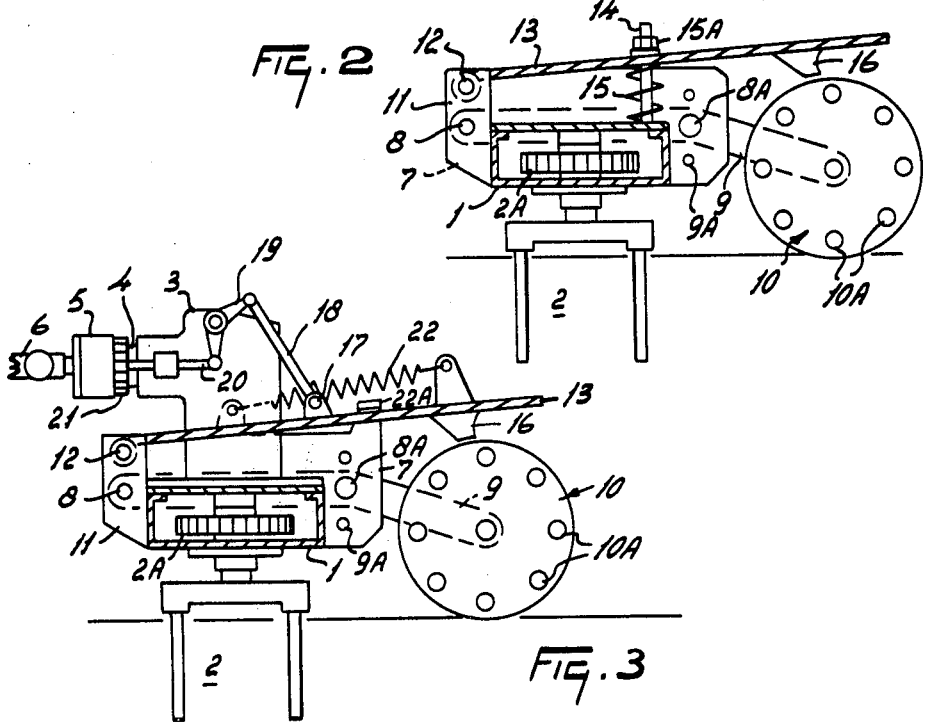
FIG. 2
FIG. 3

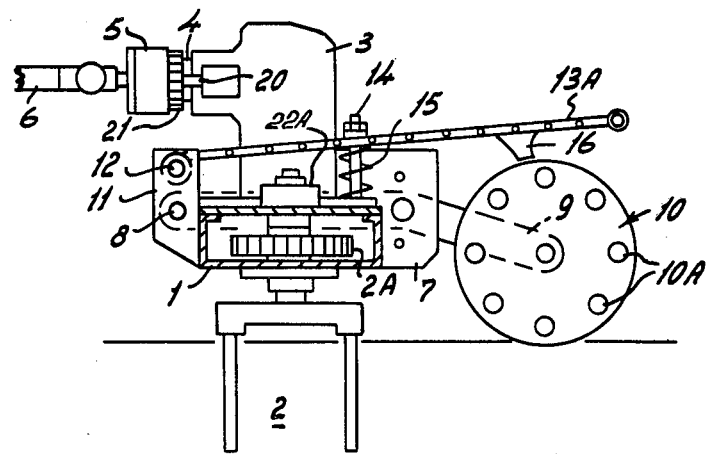
FIG. 4
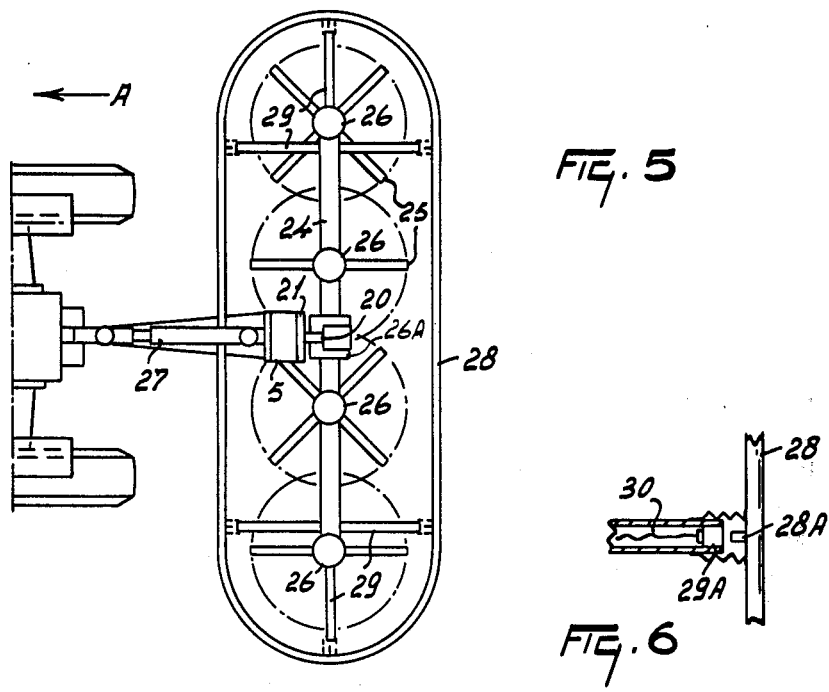
FIG. 5
FIG. 6

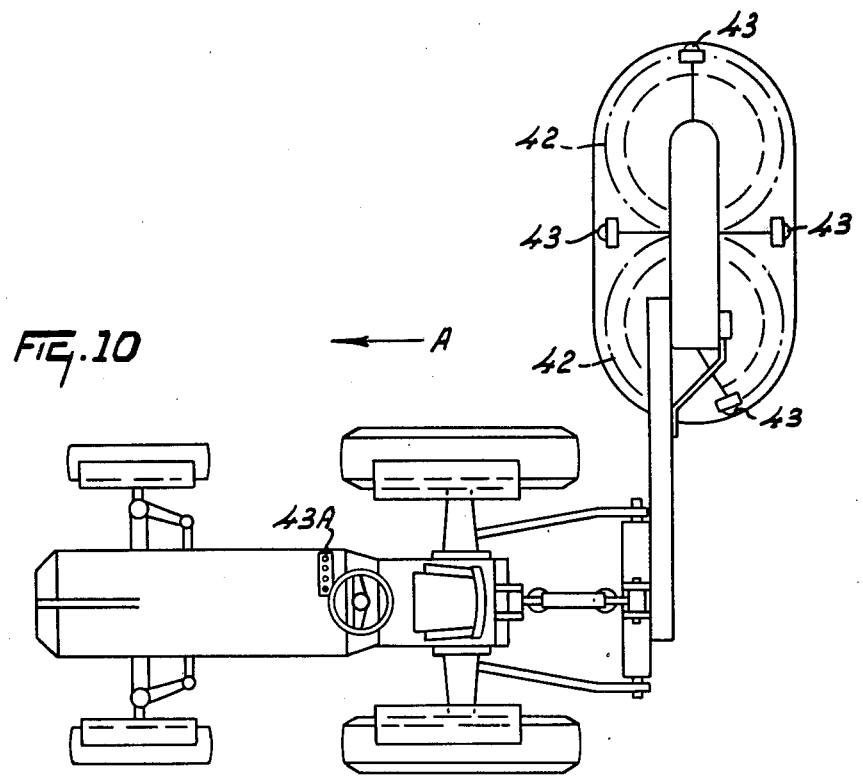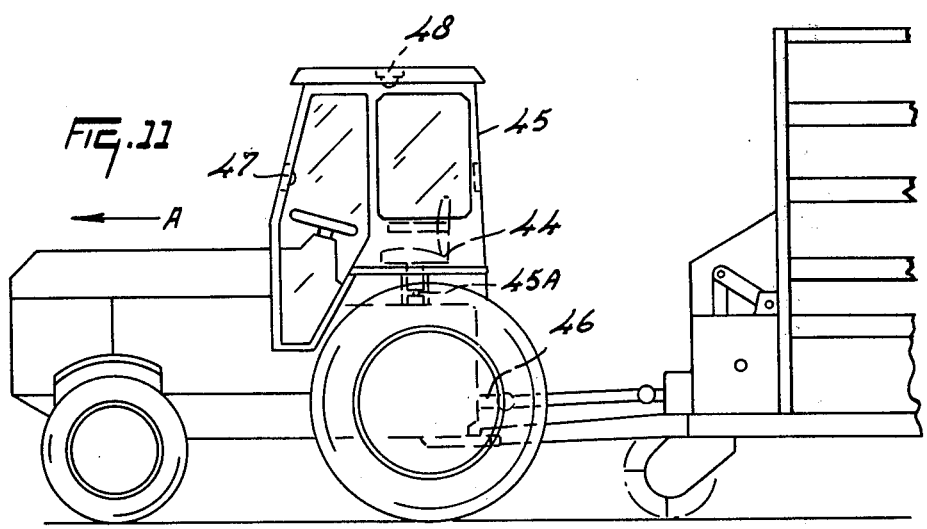

MOVEMENT STOPPING SAFETY DEVICE FOR AGRICULTURAL MACHINE

Agricultural machines with moving parts are inherently dangerous and there is always the risk of possibly fatal accidents when they are in use.

According to a first aspect of the present invention there is provided an agricultural machine comprising at least one member which is movable during operation of the machine, the machine being provided with protective means which is arranged adjacent the movable member, this protective means being responsive to contact with an external object or person to interrupt the movement of the movable member.

According to a second aspect of the present invention there is provided an agricultural machine comprising at least one drivable member, protective means being provided comprising at least one sensor responsive to emitted pulses or to radiation to actuate a control mechanism to interrupt the drive of the drivable member.

According to a third aspect of the present invention there is provided an agricultural machine comprising a driver's seat and a power take-off shaft, a switching mechanism being connected with the driver's seat, the switching mechanism being adapted so that the drive to the power take-off shaft is interrupted when the seat is vacated.

According to a fourth aspect of the present invention there is provided an agricultural machine comprising a driver's cab and a power take-off shaft, a photoelectric cell being disposed to sense the presence of a person in the cab and being connected in an electric circuit to interrupt the drive to the power take-off shaft when the cab is vacated.

According to a fifth aspect of the present invention there is provided an agricultural machine comprising a driver's cab and a power take-off shaft, there being provided an infrared detector, responsive to the temperature of the human body, which is connected in an electric circuit to interrupt the drive to the power take-off shaft when the cab is vacated.

Machines in accordance with the various aspects of the present invention have the safety feature that, if a person approaches too close to moving parts of the machine, or if the driver or operator of the machine leaves the controls, the drive to the moving parts of the machine is automatically interrupted.

For a better understanding of the present invention and to show how it may be carried into effect, reference will now be made, by way of example, to the accompanying drawings in which;

FIG. 1 is a plan view of a soil cultivating machine having an automatic safety system;

FIG. 2 is a view taken on the line II—II in FIG. 1;

FIG. 3 is a view corresponding to FIG. 2 showing an alternative construction;

FIG. 4 is a view corresponding to FIG. 2 showing another alternative construction;

FIG. 5 is a plan view of a hay-making machine having an automatic power cut-off system;

FIG. 6 shows on an enlarged scale a switching mechanism in the construction of FIG. 5;

FIG. 10 is a plan view of an agricultural tractor to which is hitched an agricultural machine having an automatic power cut-off system;

FIG. 11 is a side view of an agricultural tractor having three different automatic cut-off systems;

Figure 7:
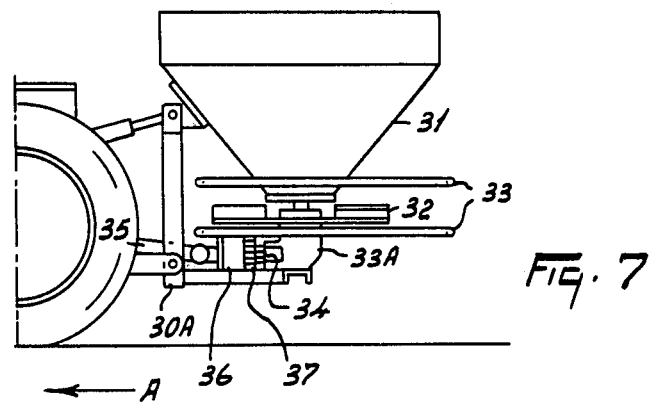
FIG. 7 is a side view of a centrifugal fertilizer dispender having an automatic cut-off system.

FIGS. 1 and 2 show schematically an agricultural machine in the form of a soil cultivating machine. This machine comprises a box-shaped frame member 1, extending transversely of the intended direction A of operative travel of the machine. Regularly spaced upwardly extending shafts of cultivating members 2 are journalled in the member 1. Inside the member 1, each of the shafts is provided with a pinion 2A, the pinions 2A on the shafts of adjacent cultivating members being drivably in mesh with one another. One of the shafts near the center of the machine projects into a gearbox 3, in which the shaft 2 is drivably connected with a shaft 4 extending in the direction A. The shaft A is coupled, by an overload safety coupling 5 (which may be a shear pin coupling) and by an auxiliary shaft 6, with the power take-off shaft of a tractor. At the ends, the box-shaped frame member 1 is provided with upwardly extending plates 7. Near the front, the plates are provided with pins 8, on which are pivotably mounted arms 9 extending to the rear along the plates. By inserting a bolt 8A into one of a row of holes 9A in the rear parts of the plates 7, and into a hole in the arm 9, the arms 9 can be set in any one of a plurality of positions. Between the rear ends of the arms 9 is mounted a freely rotatable roller 10 which comprises elongate rods 10A. At the front, the frame member 1 is provided near its ends with upwardly extending tags 11. By means of a pin 12 extending transversely of the direction A a protective means in the form of a plate 13 is pivotally mounted between each tag 11 and the adjacent plate 7. From the Figures it will be apparent that the plate 13 covers at least the space between the box-shaped frame member 1 carrying the cultivating members 2 and the roller 10 arranged behind these members and is vertically displaceable. There is a recess in the plate 13 to accommodate the gearbox 3. In this embodiment, the plate 13 extends to a position almost vertically above the rear of the roller 10. On the rear of the frame member 1, there is a plurality of compression springs 15 mounted on supports 14, the tops of these springs 15 bearing on the lower surface of the plate 13 so that the plate 13 is held against stops 15A of the supports. Near the rear, the plate 13 has four hook-like projections 16 so that when the plate 13 turns downwards, these projections move into the path of the rods 10A of the roller, which is thus prevented from rotating.

In the embodiment shown in FIG. 3, the screening plate 13 is provided at the top near the center with a support lug 17, to which is pivoted an arm 18, which extends upwardly and forwardly from bottom to top. The arm 18 is pivotally connected with a bell crank 19. The bell crank 19 is mounted on the gearbox 3 and is pivotally coupled with a blocking member in the form of a rod 20, extending in the direction A. The rod 20 is adapted to co-operate with a pawl wheel 21 arranged on the shaft 4 behind the overload coupling 5. In this embodiment a tension spring 22 is connected between each side of the plate 13 and the respective end of the box-shaped frame member 1 to oppose downward movement of the plate, and to hold the plate against stops 22A.

The protective means may, as an alternative, be constructed, as shown in FIG. 4, as a grating 13A, which has a reduced weight. By turning downwards the grating 13A actuates a switch 22B of an electric control mechanism which then moves the rod 20 to block the pawl wheel 21.

Each of the machines operates as follows.

During operation the machine is hitched by means of a trunion 23 to the three-point lifting device of a tractor and the respective cultivating members 2 are driven by the described transmission. Adjacent cultivating members rotate in opposite senses and work overlapping strips of soil. The roller 10 can be adjusted to set the effective depth of the cultivating members 2. During normal operation the plate 13 is retained by the action of the springs 15 or 17 against the stops 15A or 22A in the positions shown in the Figures, in which the hook-like projections 16 are held away from the rod elements 10A of the roller 10. If the screening plate 13 is moved downwards, for example if someone falls onto or stands on the machine while it is in movement, the plate is turned downwards against the force of the springs 15 or 17 about the shaft 12 so that the projections 16 come into contact with the rod elements 10A, as a result of which the rotation of the roller is stopped.

In the embodiment shown in FIGS. 3 and 4, the movement of the roller 10 can be halted as described, but in addition the downward movement of the plate 13 or the grating 13A, as the case may be, causes the rod 20 to be moved, by the bell crank 19 or by the electric control mechanism actuated by the switch 22B, into engagement with the pawl wheel 21. This results in such a heavy resistance that the overload coupling 5 disengages and the driving connection for the cultivating members 2 is interrupted.

FIG. 5 shows an agricultural machine in the form of a hay-making machine comprising four working members 25 which are rotatable about upwardly extending shafts and are supported by a transverse beam 24. Each working member 25 has carriers to which tines (not shown) are fastened. The shafts of the respective working members 25 are supported in gearboxes 26 forming part of a conventional transmission, which will not be further described and which is connected by a gearbox 26A and an auxiliary shaft 27 to the power take-off shaft of a tractor to which the machine is coupled. The front of the transverse beam 24 is provided with means for coupling the machine with the three-point lifting device of the tractor. Around the working members 25, at the level of the path described by the tines and the carriers of the working members during operation, there is arranged a protective means in the form of a protective trip bar 28, which surrounds the whole assembly of working members 25, as shown in FIG. 5. The protective bar is tubular and is electrically insulated from the rest of the machine. At six places the bar 28 is provided with a contact 28A (FIG. 6), which, together with a contact 29A arranged on an arm 29, constitutes a switch connected by a lead 30 to a control mechanism for bringing a blocking member 20 into contact with a pawl wheel 21.

If a person gets too close to the paths described by the carriers and the tines of the working member 25 and thus touches the bar 29, the drive of the working members is interrupted in the manner described above by the switch 28A, 29A, and the electric control mechanism. Instead of using an electrical connection in the form of the lead 30, the switch 28A, 29A, when closed, may generate a radio-signal by means of which the tractor engine can be stopped.

Figure 8:
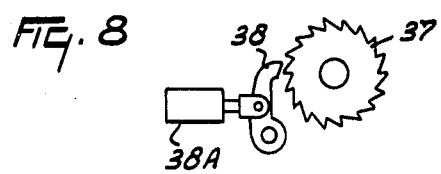
FIG. 8 shows a pawl mechanism provided in the dispender of FIG. 7.

The agricultural machine shown schematically in FIG. 7 is a centrifugal fertilizer dispenser comprising a frame coupled to a tractor by means of a hitch 30A, this frame supporting a distribution member 32 which rotates in operation about an upwardly extending shaft. There is a hopper 31 above the distribution member 32. From FIG. 7 it will be appreciated that the distribution member 32 is arranged between protective means comprising two protective trip bars 33 which are disposed so that there is exactly enough space between the bars for the ejection of the material to be spread. The distribution member 32 is driven in a known manner (not shown in detail) via a gearbox 33A. A shaft 34 projects from the front of the gearbox and is coupled by an intermediate shaft 35 to the power take-off shaft of the tractor. The shaft 34 incorporates an overload safety coupling 36, which may be a shear pin coupling. Behind this coupling the shaft 34 carries a pawl wheel 37 for cooperation with a pawl 38 (FIG. 8). The pawl 38 can be pivoted by an electric control mechanism including a coil 38A which is part of a circuit which is completed when a switch is closed upon movement of the bars 33. Engagement of the pawl 38 with the wheel 37 causes the overload coupling to disengage almost immediately, thus interrupting the drive of the distribution member.

Figure 9:
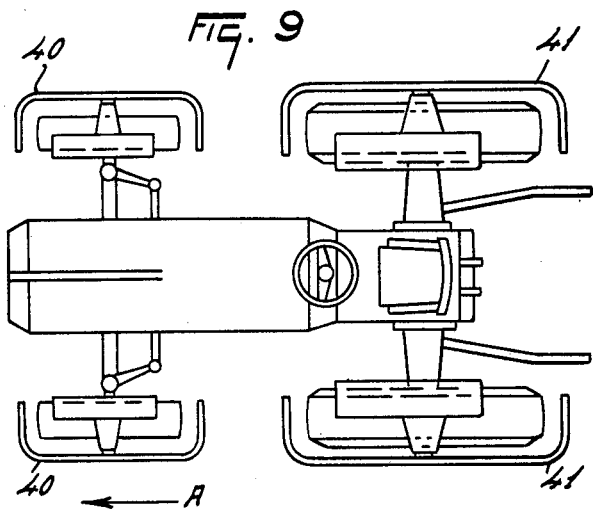
FIG. 9 is a plan view of an agricultural tractor having an automatic power cut-off system.

The agricultural machine shown in FIG. 9 is a tractor, in which protective members 40 and 41 are arranged by the front and rear wheels. The members, when touched, cause an electric circuit to be completed, as in the embodiments of FIGS. 5 to 8 so that a pawl is moved into engagement with a pawl wheel (as in FIG. 8), for example by an electromagnetic coil, which causes an overload coupling to disengage to stop the drive of the tractor wheels.

FIG. 10 shows schematically a mowing machine hitched to a tractor. This mowing machine comprises a frame supporting two cutters 42 which are arranged side by side and rotate in opposite senses. The machine has a three-point suspension coupled to the three-point lifting device of the tractor. The frame is provided on four sides with sensors 43, which may, for example be part of a sonar system or of an infrared detecting system. As soon as a person comes within a given range of the cutting elements 42, an electrically controlled mechanism is actuated by sound waves reflected from the person or the sensed infrared radiation emitted by him. The result of this is that the drive of the cutting elements is interrupted, for example as described above with reference to FIGS. 5 to 9. The tractor is equipped with a control-panel 43A which enables the tractor driver to switch off a detection element 43, for example when working in the proximity of trees or fences to prevent undesired interruption of the machine. The sensors 43 may, as an alternative, be replaced by a single rotatable sensor coupled with a computer, which is programmed to ignore the presence of the tractor.

As soon as a person comes within a given range of the working members of the machine, the drive of the member or members is stopped in the manner described above.

The agricultural machine shown in FIG. 11 is an agricultural tractor. It has a seat 44 which is mounted so that, when the tractor driver leaves the seat, the seat moves upwards and actuates a switch 45A, which causes the drive of the power take-off shaft 46 of the tractor to be cut off by electrical or mechanical means.

Also shown in the cab 45 of the tractor is a photoelectric cell 47, which becomes operative as soon as the tractor driver leaves the cab to interrupt the drive of the power take-off shaft 46 in the manner set out above. Also shown in the cab 44 is an infrared detector 48, which is inoperative while the driver is present in the cab but becomes operative as soon as the tractor driver, constituting a heat source of about 37° C., steps down from the cab to interrupt the drive of the power take-off shaft in the manner described previously. It is not necessary for all of the devices 45A, 47 and 48 to be provided in the same tractor.

While various features of the machines that have been described, and that are illustrated in the drawings, will be set forth in the following claims as inventive features, it is to be noted that the invention is not necessarily limited to those features and that it encompasses all of the features that have been described both individually and in various combinations.

We claim:

1. An agricultural machine comprising a rotary member that is moved during operation of said machine, a protective mechanism operatively associated with said member and positioned to prevent the movement of the same responsive to the actuation of monitor means, said monitor means being sensitive to a proximate external object to interrupt the movement of said rotary member, drive means connected to operate said machine through an overload coupling and said mechanism comprising a control device which interrupts drive to said machine upon actuation of said monitor means, said control device including a blocking member and the actuation of said monitor means causing said blocking member to retard the movement of a rotary shaft of said drive means whereby said overload coupling disengages the drive to the machine.

2. An agricultural machine as claimed in claim 1, in which the said mechanism comprises an electric switch which is actuated by the monitor means to energize the control device by completing a circuit.

3. An agricultural machine as claimed in claim 1, in which said blocking member includes a rod which cooperates with a pawl wheel mounted on said shaft, said rod being displaced upon actuation to interrupt the rotation of said shaft.

4. An agricultural machine as claimed in claim 1, in which the protective mechanism comprises an electrically insulated member which is movable by the object to close a switch and complete a circuit that energizes the device.

5. An agricultural machine as claimed in claim 4, which the machine comprises a hay-making machine and said insulated member surrounds the rotary member.

6. An agricultural machine as claimed in claim 1, in which said machine is a centrifugal fertilizer dispenser having an ejection member, the latter being surrounded by a protective monitor.

7. An agricultural machine comprising a roller member that is moved during operation of said machine, a pivotable cover at least partly overlying said member and positioned to prevent the movement of the same responsive to the downward actuation of cover, said machine having rotatable cultivating members positioned in advance of said roller with respect to the normal direction of operative travel, a space between said cultivating members and said roller, said cover bridging the space and means biasing the cover to an inoperative rest position.

8. An agricultural machine as claimed in claim 7, in which said cover has depending projections that arrest the rotation of said roller.

9. An agricultural machine as claimed in claim 8, in which said cover is pivotable about an axis extending transverse to the direction of travel and spring means resists the downward movement of said cover from a rest position of the cover.

* * * * *